United States Patent [19]

Shu-Hua

[11] Patent Number: 4,720,159
[45] Date of Patent: Jan. 19, 1988

[54] SPHERICAL SCANNING SYSTEM WITH IMPROVED MEANS OF WIDE, ADJUSTABLE SCANNING AREA

[76] Inventor: Yuan Shu-Hua, 140 E. Ave. 44th, #5, Los Angeles, Calif. 90031

[21] Appl. No.: 734,592

[22] Filed: May 15, 1985

[51] Int. Cl.$^4$ .............................................. G02B 26/10
[52] U.S. Cl. ....................................... 350/6.9; 350/174
[58] Field of Search ................... 350/6.2, 6.4, 6.9, 174

[56] References Cited

U.S. PATENT DOCUMENTS

| | | | |
|---|---|---|---|
| 3,217,623 | 11/1965 | Hotchkiss | 350/6.4 |
| 3,521,068 | 7/1970 | Armstrong et al. | 350/174 |
| 3,651,256 | 3/1972 | Sherman et al. | 350/6.9 |
| 4,030,839 | 6/1977 | Rickert | 350/174 |

*Primary Examiner*—John K. Corbin
*Assistant Examiner*—Loha Ben

[57] ABSTRACT

A scanning system mainly consists of a condenser, a rotating mirror, and a ringlike lens. Collimating laser beams shine the condenser in designative position and the leaving beam combined to one powerful beam, or the leaving beams extremely close together. Therefore, the intensity increases greatly. Then, laser beams reflect on a rotating mirror. Along with the rotation of the mirror inside spiral, the mirror moves up and down along the appointed angle line in the effective range. After that, the beams refract in the ringlike lens. The direction of the mirror's normal and the position of the mirror change continuously, so the reflective beams can have different directions and leaving positions. The ringlike lens can refract the laser beams coming from the mirror with varied directions and positions because of the ringlike shape. This system can nearly cover whole space round it. In combination with all improved elements of the system, functions of wide, adjustable scanning area are achieved. To design, the system should require much more optics. Here, we lay emphasis on main parts of the system.

2 Claims, 8 Drawing Figures

SPHERICAL SCANNING SYSTEM WITH IMPROVED MEANS OF WIDE, ADJUSTABLE SCANNING AREA

BACKGROUND OF THE INVENTION

This invention relates in general to scanning systems.

There are varied scanning systems being employed in industries. Some use prisms, and mirrors. However, those systems are very different from this one. No one system or the related one can be found to complete a whole task throughout.

SUMMARY OF THE INVENTION

The spherical scanning system according to one embodiment of the present invention comprises a condenser, a rotating mirror and a ring-like lens. The beauty of this invention is to use the condenser to combine laser beams in order to increase the intensity of laser light, to use a ring-like lens for the purpose of expanding a scanning area and to use a rotating mirror to reflect the condensed beams toward the ring-like lens. Its advantages enable one to accomplish a scanning work effectively and throughout by only using this simple system. Besides that, the system is easy to be operated since turning the mirror is not a difficult mechanical job. Its usage can be likely extended to many fields related to a certain type of scan.

DESCRIPTION OF THE PREFERRED EMBODIMENT

Figure 1:
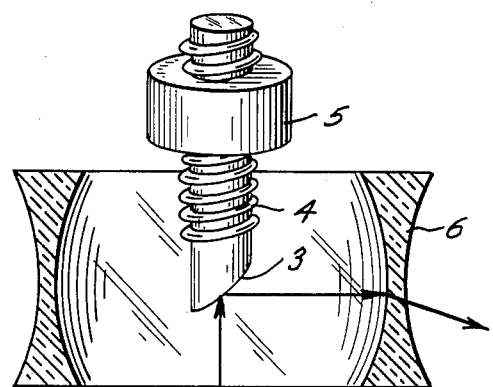
FIG. 1 is a perspective view of a spherical scanning system with improved mean of wide, adjustable scanning area according to a typical embodiment of the present invention.

For the purposes of promoting an understanding of the principles of this invention, reference will now be made to the embodiment illustrated in the drawings. It will however be understood that no limitation of the scope of this invention is thereby intended, such options and further modifications in the illustrated system, and such further applications of the principles of this invention as illustrated therein being contemplated as would normally occur to one skilled in the art which this invention relates to.

Referring to FIG. 1, there is illustrated a spherical scanning system which is similar in general size, but different in shape and configuration to a general scanning system. The system includes a condenser 2, a rotating mirror 3 that is located inside a ring-like lens 6. 1A, 1B and 1C are laser sources. The mirror is attached to the drive screw 4 and the screw nut 5 is connected to a drive screw 4.

Figure 2:
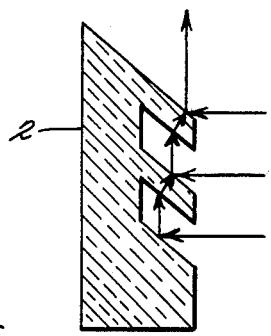
FIG. 2 is a section view of a parallel condenser taken along line 12—12 of FIG. 1.

Referring to FIG. 2, this is a parallel condenser which is made a set of plates each plate with plane surfaces that are parallel to each other, and the both plane surfaces of sigle plate have coatings.

Figure 3:
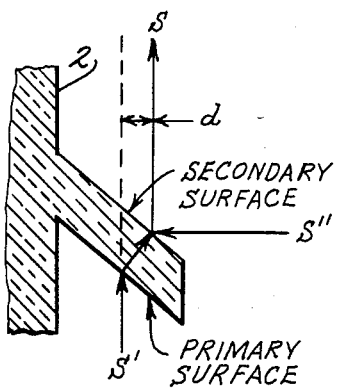
FIG. 3 is a partial section view of the parallel condenser of FIG. 2.

Referring to FIG. 3, the coating on a primary surface is anti-reflection coating which allows laser beams to pass throught a condenser with minimal loss and the coating on secondary surface has two functions, one is to highly reflect the laser beams coming directly from laser sources, and another function is to transmit the laser beams coming from primary surface with high transmission. In other words, for the laser beams coming from laser sources, the coating on a secondary surface is high-reflectivity (HR) coating. For the laser beams coming from a primary surface, the coating on the secondary surface becomes antireflection coating. The beam S' passing through the plate, it emerges parallel to its original direction but with a lateral displacement d. The beam S" reflects on a secondary surface and changes its original direction. The beam S is the combination of beam S', S". There are two necessary conditions needed to achieve above function. First, the reflective beam of S" must be parallel to the original direction of S'. Second, beam S', S" hit a secondary surface at the same spot.

Figure 4:
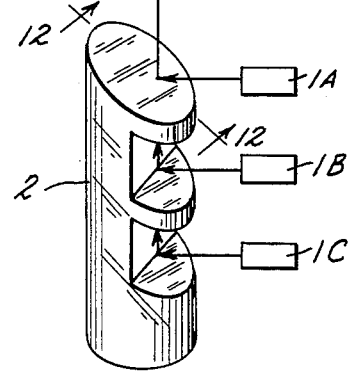
FIG. 4 is a perspective view of a conical condenser.

Referring to FIG. 4, there is illustrated a conical condenser. This is a large conical shaped object with a small conical shaped recess bored into its center. The small conical shaped recess has sides that are parallel to the larger conical sides.

Figure 5:
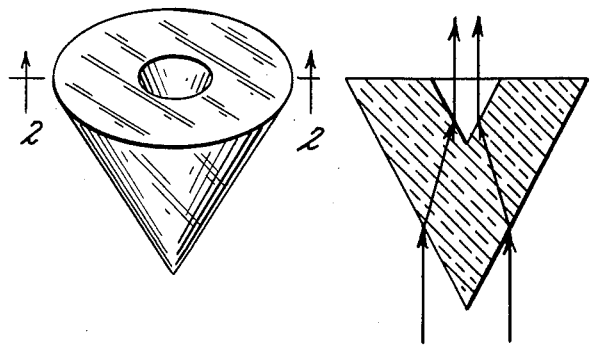
FIG. 5 is a section view of conical condenser taken along line 2—2 of FIG. 4.

Referring to FIG. 5, this is a section view of a conical condenser. There are two pairs of the parallel surfaces.

Figure 6:
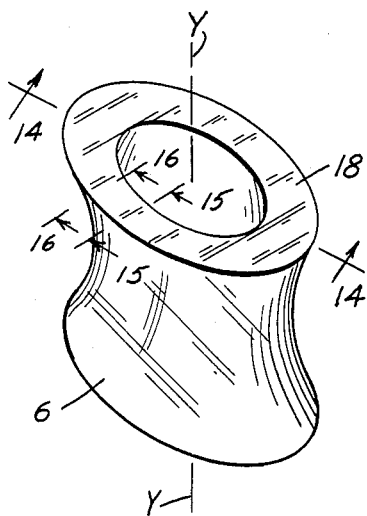
FIG. 6 is a perspective view of a ring-like lens.

Referring to FIG. 6, this is a ring-like lens 6. The purpose for using the lens is to expand the scanning area. The ring-like lenses are possible to have varied shapes like equiconvex, biconcave and biconvex etc, that depends on individual usage.

Figure 7:
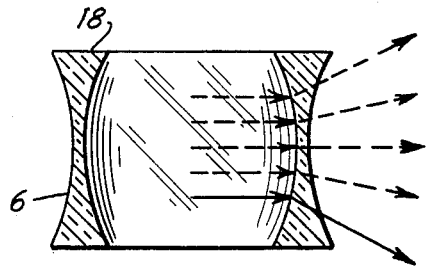
FIG. 7 is a section view of the ring-like lens taken along line 14—14 of FIG. 6.
Figure 8:
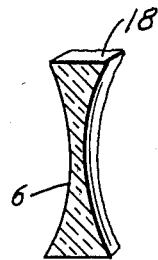
FIG. 8 is a partial section view of the ring-like lens taken along lines 15—15 and 16—16 of FIG. 6.

Referring to FIG. 7 and FIG. 8, part 18 is a small portion of the lens 6. The part 18 revolving round the center axis Y of the ring-like lens 6 forms a ring-like lens. The laser beams reflected by the mirror will be refracted by the lens 6. In FIG. 7, set the mirror surface 45 degrees to the principal planes of a ring-like lens, the refracted beams leaving the lens 6 have an angle with its optical axis and the leaving beams are able to cover a wide zone.

Another important usage of the system is to adjust the mirror to get the laser beams in specially designated direction. It is simpler and faster to set an appointed direction of the scanning laser beams.

It is to be understood that although a spherical scanning system has been illustrated, the various features of the disclosed invention are equally well suited to virtually every type of scanning system design and although various materials and connection techniques are possible, the optimum materials and dimensions will depend in part on the basic scanning style and size as well as its intended application.

What is claimed is:

1. A spherical scanning system comprising:
   a. a condenser designed to combine reflected and refracted beams from parallel laser beams emanated from laser sources in order to increase the intensity of laser light;
   b. a ring-like divergent lens having inside and outside concave surfaces; and
   c. a rotating mirror positioned in optical alignment with said condenser, and inside and in coaxial relationship with said divergent lens, said rotating mirror being affixed in an inclined position at a lower end of a threaded drive screw which can be threadably moved up and down in a determined range to reflect the combined reflected and refracted beams toward said inside concave surface.

2. A spherical scanning system comprising;

a. a conical condenser lens designed to combine refracted beams from parallel laser beams generated from laser sources in order to increase the intensity of laser light, said conical condenser lens having a small cone-shaped recess bored into its center, the slanted wall of the recess and that of the conical condenser lens being parallel to each other;

b. a ring-like divergent lens having inside and outside concave surfaces; and c. a rotating mirror positioned in optical alignment with said conical condenser lens, and inside and in coaxial relationship with said divergent lens, said rotating mirror being secured in an inclined position at a lower end of a threaded drive screw which can be threadably moved up and down in a determined range to reflect the combined refracted beams toward said inside concave surface.

* * * * *